United States Patent
Veligdan (12)

(10) Patent No.: US 6,307,995 B1
(45) Date of Patent: Oct. 23, 2001

(54) PLANAR OPTICAL WAVEGUIDES FOR OPTICAL PANEL HAVING GRADIENT REFRACTIVE INDEX CORE

(76) Inventor: James T. Veligdan, 6 Stephanie La., Manorville, NY (US) 11949

( * ) Notice: Subject to any disclaimer, the term of this patent is extended or adjusted under 35 U.S.C. 154(b) by 0 days.

(21) Appl. No.: 09/543,380

(22) Filed: Apr. 5, 2000

(51) Int. Cl.[7] .................................................. G02B 6/10
(52) U.S. Cl. ........................................ 385/129; 385/901
(58) Field of Search .................................. 385/115, 116, 385/120, 121, 123–133, 141–147, 901

(56) References Cited

U.S. PATENT DOCUMENTS

| | | | |
|---|---|---|---|
| 3,801,181 | 4/1974 | Kitano et al. | 359/652 |
| 4,087,159 | 5/1978 | Ulrich | 385/129 |
| 4,229,070 | 10/1980 | Olshansky et al. | 385/124 |
| 4,383,318 | 5/1983 | Barry et al. | 372/6 |
| 4,578,097 | 3/1986 | Berkey | 65/403 |
| 4,603,421 | 7/1986 | Scifres et al. | 372/50 |
| 5,381,502 | 1/1995 | Veligdan | 385/115 |
| 5,909,529 | 6/1999 | Bhagavatula | 385/147 |
| 5,949,942 | 9/1999 | O'Connor | 385/129 |
| 5,953,469 | 9/1999 | Zhou | 385/22 |
| 5,956,447 | 9/1999 | Zel'Dovich et al. | 385/116 |
| 6,031,954 | 2/2000 | Higuchi | 385/120 |

*Primary Examiner*—Brian Healy
*Assistant Examiner*—Michelle R. Connelly-Cushwa
(74) *Attorney, Agent, or Firm*—Reed Smith LLP; William J. McNichol, Jr.; Matthew J. Esserman

(57) ABSTRACT

An optical panel is disclosed. A plurality of stacked planar optical waveguides are used to guide light from an inlet face to an outlet face of an optical panel. Each of the optical waveguides comprises a planar sheet of core material having a central plane. The core material has an index of refraction which decreases as the distance from the central plane increases. The decrease in the index of refraction occurs gradually and continuously.

52 Claims, 5 Drawing Sheets

PLANAR OPTICAL WAVEGUIDES FOR OPTICAL PANEL HAVING GRADIENT REFRACTIVE INDEX CORE

STATEMENT REGARDING FEDERALLY SPONSORED RESEARCH OR DEVELOPMENT

This invention was made with Government support under Contract No. DE-AC02-98CH10886 awarded by the Department of Energy. The Government has certain rights in this invention.

BACKGROUND OF THE INVENTION

1. Field of the Invention

The present invention relates generally to the field of display devices. In particular, the present invention relates to an optical panel having a plurality of stacked planar optical waveguides for guiding light from an inlet face to an outlet face of the optical panel. More specifically, the present invention relates to a plurality of stacked planar optical waveguides for an optical panel, the planar optical waveguides comprising a core material having a gradient refractive index.

2. Description of the Background

Optical screens typically use cathode ray tubes (CRTs) for projecting images onto the screen. The standard screen has a width to height ratio of 4:3 with 525 vertical lines of resolution. An electron beam is scanned both horizontally and vertically across the screen to form a number of pixels which collectively form the image.

Conventional cathode ray tubes have a practical limit in size, and are relatively deep to accommodate the required electron gun. Larger screens are available which typically include various forms of image projection. However, such screens have various viewing shortcomings including limited viewing angle, resolution, brightness, and contrast, and such screens are typically relatively cumbersome in weight and shape. Furthermore, it is desirable for screens of any size to appear black in order to improve viewing contrast. However, it is impossible for direct view CRTs to actually be black because they utilize phosphors to form images, and those phosphors are non-black.

Optical panels may be made by stacking planar optical waveguides, each waveguide having a first end and a second end, wherein an outlet face is defined by the plurality of first ends, and wherein an inlet face is defined by the plurality of second ends. Such a panel may be thin in its depth compared to its height and width, and the cladding of the waveguides may be made black to increase the black surface area. As shown in FIG. 4, these optical panels typically comprise planar optical waveguides 10a of the type which include discrete cladding layers 82 directly adjacent to and surrounding core layers 80. The cladding layers 82 have an index of refraction which is discretely lower than that of the core layers 80 and thus enables transmission of light 22 by internal reflection. This results in discrete reflections, or bounces, of the light 22 at interfaces 95 between the cladding layers 82 and core layers 80. This optical waveguide configuration is of the type which will be referred to hereinafter as "step index cladding".

However, optical waveguides of the step index cladding type have at least two significant drawbacks. First, a small loss of light takes place at each bounce at the interface 95 between the core layer 80 and surrounding cladding layers 82. Although the loss of light at each bounce within the optical waveguide is extremely small, a light ray may undergo a large number of bounces as it traverses the core layer. Optimally, it is desired to have the core layer thickness to be as small as possible to achieve higher resolutions. But, as the core layer thickness decreases, the number of bounces the light ray must endure increases. Therefore, the amount of light loss that occurs in optical panels (and in particular, higher resolution optical panels), becomes a significant detriment to the overall efficiency and performance of the optical panel, as well as the quality (e.g. brightness, sharpness, etc. . . . ) of the image.

FIG. 5 illustrates the second significant drawback of using optical waveguides of step index cladding type. When light 22 entering core layer 80 comprises two or more different wavelengths, a phenomenon known as chromatic dispersion results. As shown in the figure, light 22 comprising two different wavelengths, even entering the core layer 80 at the same angle, will be displaced when exiting the core layer 80 resulting in two corresponding light rays 22a, 22b. These light rays 22a, 22b exit the outlet face of the optical panel at slightly different exit angles resulting in poor color quality of the image. This means that the exit angle of the light at the outlet face of the optical panel is dependent on the wavelength, or color, of the components of the input light. As can be envisioned, this phenomenon is further exaggerated when the light path that a light ray follows through the core layer 80 increases. For example, the chromatic dispersion effect increases as the core layer 80 becomes longer (i.e. in the direction that the overall light travels therethrough) for larger optical panels. Thus, the chromatic dispersion that occurs in optical panels using optical waveguides of step index cladding type is another significant detriment to the performance of the optical panel, as well as the quality (e.g. color, sharpness, etc. . . . ) of the image.

Therefore, the need exists for an optical panel which possesses the advantages corresponding to the use of stacked optical waveguides, but which does not suffer from the decrease in efficiency, performance and quality resulting from the light loss from the discreet bounces that the light undergoes in the optical waveguides of step index cladding type, nor suffer from the deleterious effects of chromatic dispersion when using optical waveguides of step index cladding type.

SUMMARY OF THE INVENTION

The present invention is directed to a plurality of stacked planar optical waveguides for an optical panel. Each optical waveguide comprises a planar sheet of core material having a central plane. The core material has an index of refraction which decreases as the distance from the central plane increases.

The present invention is also directed to an optical panel which includes a plurality of stacked optical waveguides. Each optical waveguide has a first end and a second end. An outlet face is defined by the plurality of first ends and an inlet face is defined by the plurality of second ends. Each optical waveguide comprises a planar sheet of core material having a central plane. The core material has an index of refraction which decreases as the distance from the central plane increases.

The present invention solves problems experienced in the prior art, such as the decrease in efficiency, performance and quality resulting from the light loss from the discreet bounces that the light undergoes in the optical waveguides of step index cladding type, and the adverse affects of chromatic dispersion when using optical waveguides of step index cladding type, by providing a plurality of planar optical waveguides for an optical panel, the planar optical waveguides comprising a core material having a gradient refractive index. The present invention also retains the advantages which correspond to a stacked optical waveguide panel, such as improved contrast and minimized depth.

Those and other advantages and benefits of the present invention will become apparent from the detailed description of the invention hereinbelow.

BRIEF DESCRIPTION OF THE SEVERAL VIEWS OF THE DRAWINGS

For the present invention to be clearly understood and readily practiced, the present invention will be described in conjunction with the following figures, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical optical display panel. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
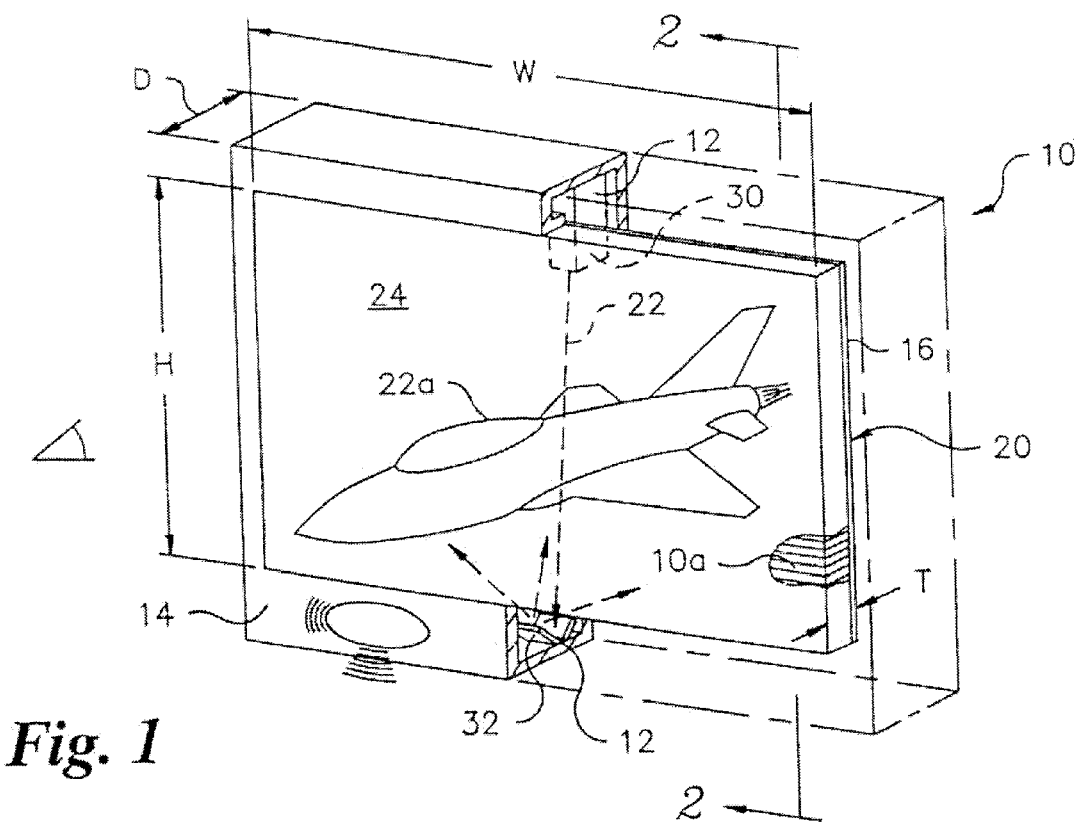
FIG. 1 is an isometric view schematic illustrating an optical panel.

FIG. 1 is an isometric view schematic illustrating an optical panel 10. The optical panel 10 includes a plurality of waveguides 10a, wherein one end of each waveguide 10a forms an inlet for that waveguide, and wherein the opposite end of each waveguide 10a forms an outlet for that waveguide 10a. The optical panel 10 also includes a light generation system 12, a housing 14 in which the light generation system 12 and the plurality of waveguides 10a are mounted, and a coupler 16.

Each waveguide 10a extends horizontally, and the plurality of stacked waveguides 10a extends vertically. The plurality of inlet ends define an inlet face 20 for receiving image light 22. The plurality of outlet ends define an outlet face 24 disposed substantially parallel with the inlet face 20 for displaying light 22. The light 22 may be displayed in a form such as, but not limited to, a video image 22a.

The housing 14 is sized larger in height and width than the combination of the light generation system 12 and the plurality of waveguides 10a, to allow the placement of the plurality 10a and light generation system 12 therein. The housing 14 has an open front to allow for viewing of the outlet face 24, and has a closed depth D looking from the open front to the back of the housing 14.

The light generation system 12 provides the light viewed through the waveguides 10a. The light generation system 12 includes a light source 30, and a light redirection element 32 that redirects incident light 22 from the light source 30 into the coupler 16, which light redirection element 32, in combination with the coupler 16, allows for a reduction in the depth D of the housing 14. This reduction allowance occurs where the light redirection element 32 is configured for turning the light 22 from a source 30, which source 30 is placed within the housing 14 proximate to and parallel with the vertical stack of the plurality of waveguides 10a, into the coupler 16, which then acutely turns the light 22 into the waveguides 10a. The coupler 16 is preferably effective for turning the image light in an exemplary range of about 45° up to about 90°, in order to generate approximately horizontal transmission through the plurality of waveguides 10a. The light generation system 12 may also include a modulator and further imaging optics. This light generation system 12 is discussed with more particularity with respect to FIG. 2.

The parallel surfaces of the inlet face 20 and the outlet face 24 allow the panel 10 and enclosing housing 14 to be made ultrathin in depth. The panel 10 has a nominal thickness T which is the depth of the waveguides 10a between the inlet face 20 and the outlet face 24, and thickness T is substantially less than the height H and width W of the outlet face 24. The panel 10 may be configured in typical television width to height ratios of 4:3 or 16:9, for example. For a height H of about 100 cm and a width W of about 133 cm, the panel thickness T may be about 1 cm. The depth D may vary accordingly with the thickness T, but, in the embodiment described hereinabove, the depth D of the housing 14 is preferably no greater than about 12 cm.

Figure 2:
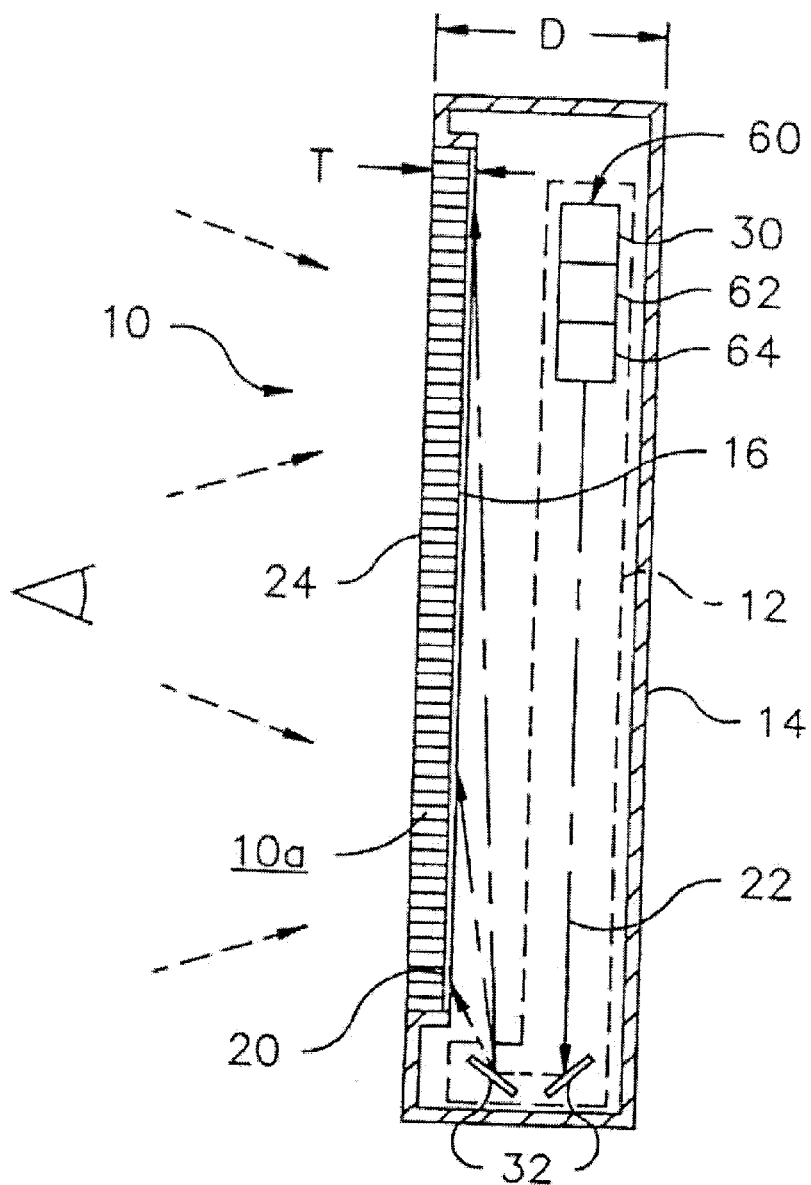
FIG. 2 is a side view cross sectional schematic of an optical panel.

FIG. 2 is a side view cross sectional schematic of an optical panel 10. The panel 10 includes a plurality of stacked waveguides 10a, a light generation system 12, a coupler 16, and a housing 14.

The light generation system 12 includes a projector 60 which is optically aligned with a light redirection element 32. An image is projected onto the light redirection element 32, and is then redirected to the coupler 16 for transmission through the waveguides 10a for display on the outlet face 24. Preferably, the projector 60 is disposed adjacent to the top of the inlet face 20 for projecting the image light 22 generally parallel thereto, and is spaced therefrom a distance sufficient to allow for a turning of the image light 22 from the light redirection element 32 into the coupler 16 for transmission through the waveguides 10a.

The projector 60 may include a suitable light source 30 for producing the light 22. The light source 30 may be a light bulb (e.g. filament or arc type) or laser. The projector 60 may be a slide projector or video projector which may include a modulator 62 for modulating the light 22 to form an image 22a. The modulator 62 may be, for example, a conventional Liquid Crystal Display (LCD), a Digital Micromirror Device (DMD), a GLV, a laser raster scanner, a PDLC, an LCOS, a MEMS, or a CRT. The projector 60 may also include suitable image optics 64 for distributing or broadcasting the image light 22 horizontally and vertically across the light redirection element 32 for properly focused transmission to the coupler 16. The image optics 64 may include focusing and expanding lenses and/or mirrors. One or more light generation systems 12, such as between 2 and 4 such systems, may be used to provide light to one or more portions of the coupler 16. Expansion lenses may be used for both the imaging optics 64 and the light redirection element 32 to expand the image light 22 both vertically and horizontally over the coupler 16. Alternatively, suitable rastering systems may be used as the light generation system 12 to form the image by rastering the image light 22 both horizontally and vertically across the coupler 16.

In the illustrated embodiment, the light 22 is initially projected from the projector 60 vertically downward inside the housing 14 to the bottom thereof where the light redirection elements 32 are mounted, and the light redirection elements 32 then redirect the image light 22 vertically upwardly at a small acute angle for broadcast over the entire exposed surface of the coupler 16. In an alternative embodiment, the projector 60 could be placed beneath the inlet face 20 rather than behind the inlet face 20. In this alternative embodiment, the light redirection elements 32 may be eliminated from the light generation system 12.

The allowable incidence angle of the image light 22 on the coupler 16 is determined by the capability of the coupler 16 to turn the light 22 into the inlet face 20 of the panel 10. The greater the turning capability of the coupler 16, the closer the projector 60 may be mounted to the coupler 16 for reducing the required depth D of the housing 14.

Figure 3:
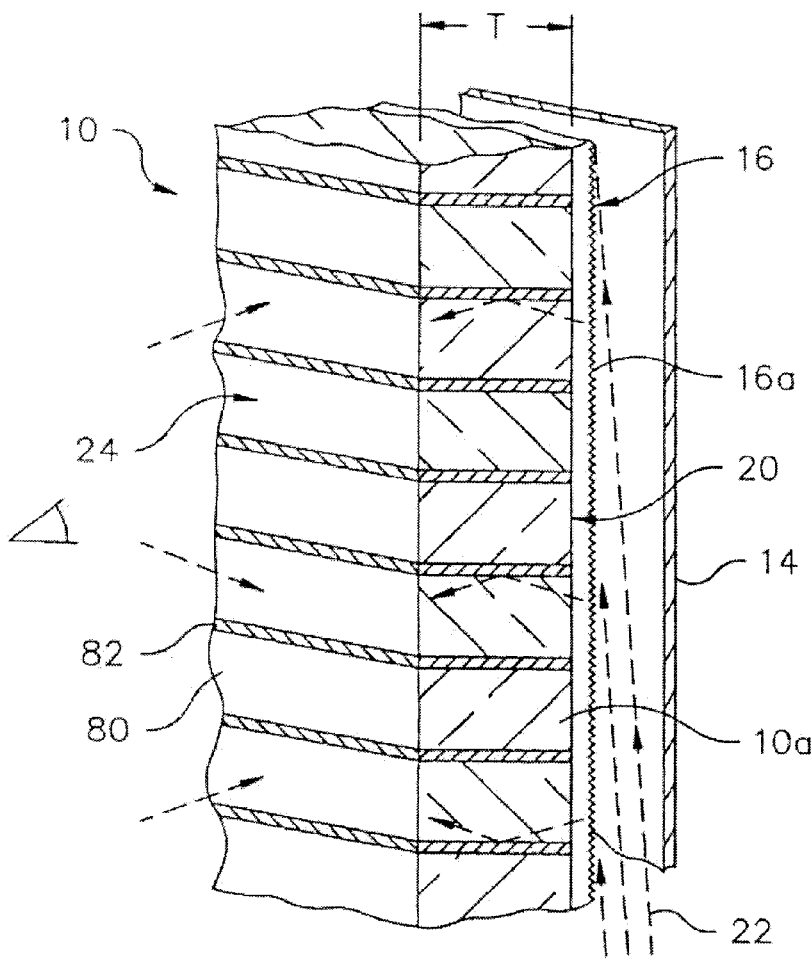
FIG. 3 is a schematic illustrating a horizontal and vertical cross section of an optical panel using planar optical waveguides that utilize step index cladding.

FIG. 3 is a schematic illustrating a horizontal and vertical cross section of an optical panel 10. The panel 10 includes a plurality of vertically stacked step optical waveguides 10a of step index cladding type (of the type shown in FIGS. 4 and 5 referenced above in the "Background of the Invention" section), a light generation system 12 (see FIG. 2), a coupler 16, and a housing 14.

Each waveguide 10a of the plurality of waveguides 10a of step index cladding type as shown in FIG. 3 includes a central transparent core 80 having a first index of refraction. The core 80 may be formed of any material known in the art to be suitable for passing light waves therethrough, such as, but not limited to Plexiglas® or polymers. Plexiglas® is a brand of polymethylmethacrylate (PMMA) which can be obtained from Rohm+Haas in Philadelphia, Pa. The central core 80 may alternatively be formed of an optical plastic, such as Lexan®, commercially available from the General Electric Company®, or glass, such as type BK7. Optical waveguides of this type, e.g. using individual glass sheets, are typically in the range of between 2 and 200 microns thick and may be made of a manageable length and width. For low resolution applications, such as for car brake or signal lights, indicator displays, or advertisement displays, the thickness of the glass sheets (or other material comprising the central core 80) may be much greater, such as ¼ inch or more. The central core 80 is laminated between at least two cladding layers 82. The cladding layers 82 immediately in contact with the glass have a second index of refraction which is discretely lower than that of the cores 80, thus allowing for internal reflection of the light 22 as it is transmitted through the cores 80. The cladding 82 may be a suitable plastic, Plexiglas®, glass, adhesive, polyurethane, low refractive index polymer, or epoxy, for example, and is preferably black in color. The manner of forming the cores 80 and cladding layers 82 and additional alternative compositions therefor in step index cladding type optical waveguides are discussed with more specificity in copending patent application Ser. No. 09/469,092, filed Dec. 21, 1999, which application is hereby incorporated herein by reference thereto. Furthermore, additional alternative configurations of the waveguides, e.g. using a black pigmented layer in-between adjacent cladding layers of adjacent optical waveguides, may be implemented. These alternative configurations as well as the various compositions/formation techniques of the black pigmented layer are also incorporated herein by reference to the copending patent application Ser. No. 09/469,092.

Figure 4:
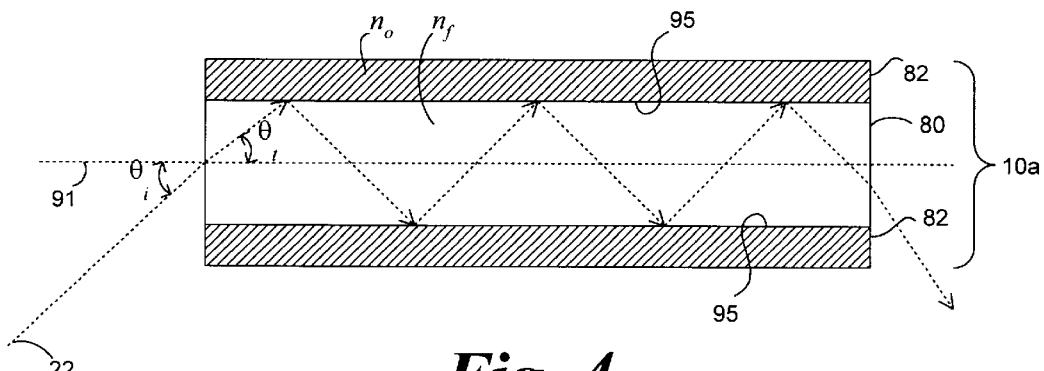
FIG. 4 is a side view cross sectional schematic of a planar optical waveguide that utilizes step index cladding.
Figure 5:
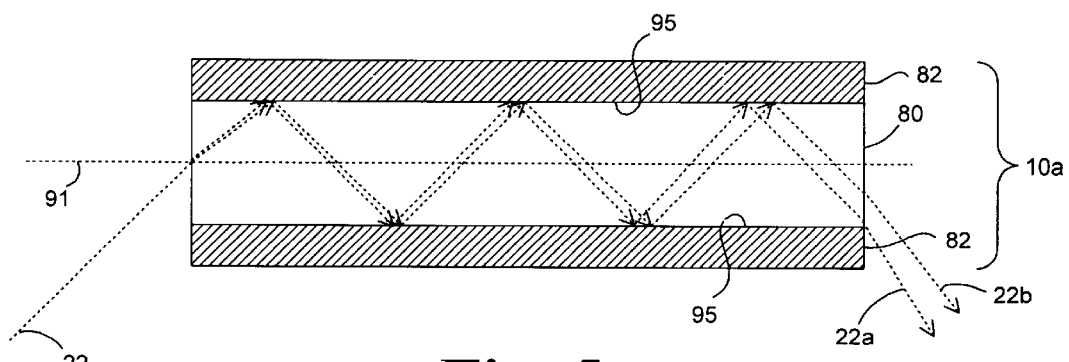
FIG. 5 is a side view cross sectional schematic of the planar optical waveguide shown in FIG. 4 illustrating chromatic dispersion of the light traveling therethrough.

FIG. 4, as described above, is a side view cross sectional schematic of a planar optical waveguide 10a of step index cladding type. The waveguide 10a includes core 80 having a central plane 91 associated therewith and is surrounded by discrete cladding layers 82. As shown in the figure, light 22 traveling through the core is internally reflected at the interfaces 95 between the core 80 and surrounding cladding layers 82. At each of the reflections, or discrete bounces, there is a finite amount of light loss.

The internal reflection occurs provided that the incident angle at each interface 91 is greater than $\theta_r = \sin^{-1}(n_o/n_f)$, where $n_f$ is the refractive index of the core 80 and $n_o$ is the refractive index of the cladding layer 82. If the waveguide 10a has a thickness (i.e. including the core 80 and surrounding cladding layers 82) M and a length L, the path length p traversed by the light ray 22 will be expressed by the following equations:

$$p = L/(\cos\theta_i)$$

$$p = L/(1-\sin^2\theta_i)^{1/2}$$

$$p = L/(1-(n_o/n_f)^2 \sin^2\theta_i)^{1/2}$$

$$p = n_f L/((n_f^2 - n_o^2)\sin^2\theta_i)^{1/2}$$

The number of reflections, or bounces, N is then given by the following equations:

$$N = (p/(M/\sin\theta_1)) \pm 1$$

$$N = ((n_o L \sin\theta_i)/(M(n_f^2 - n_o^2 \sin^2\theta_i)^{1/2})) \pm 1$$

rounded off to the nearest whole number. The "±1", which depends on where the light ray strikes the inlet face, is of no significance when N is large, so it therefore may be ignored. For example, if M=50 μm, $n_f$=1.6, $n_o$=1.0, and $\theta_i$=30°, N is approximately 6500 reflections per meter. Since a large number of reflections N usually occurs, the finite amount of loss resulting from each discrete bounce at the interfaces 95 is cumulative and thus becomes a significant factor in adversely affecting the efficiency of the optical panel. This undesired quality, combined with the deleterious effects of chromatic dispersion as mentioned with respect to FIG. 5 above, are solved by using planar optical waveguides having a gradient refractive index core as described below with reference to FIGS. 6 and 7.

Figure 6:
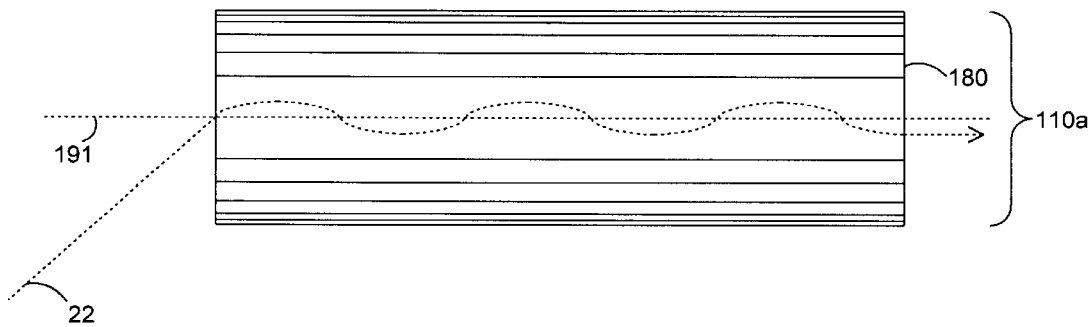
FIG. 6 is a side view cross sectional schematic of a planar optical waveguide that utilizes a gradient refractive index core, in accordance with a preferred embodiment of the present invention.
Figure 7:
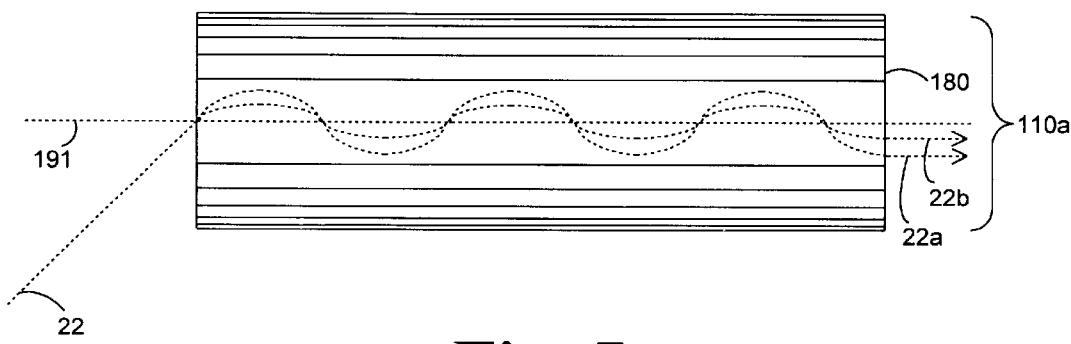
FIG. 7 is a side view cross sectional schematic of the planar optical waveguide shown in FIG. 6 illustrating the reduction or elimination of chromatic dispersion, in accordance with a preferred embodiment of the present invention.

FIG. 6 is a side view cross sectional schematic of a planar optical waveguide 110a that utilizes a gradient refractive index core 180, in accordance with a preferred embodiment of the present invention. The planar optical waveguide 110a comprises a planar sheet of gradient refractive index core material 180 having a central plane 191 associated therewith. The core material 180 has an index of refraction which decreases as the distance from the central plane increases. Note that the solid horizontal lines having varying distances from one another in FIGS. 6 and 7 represent the gradient refractive index within the core material 180, i.e. not the shape of the waveguide. This decrease in the refractive index may occur gradually and continuously and at a constant rate.

Alternatively, the rate of decrease in the refractive index may increase or decrease as the distance from the central plane increases. In other words, the rate of decrease in the refractive index may occur in an exponential fashion.

The composition of the core material 180 varies such that the core material 180 at the central plane 191 comprises a first material, and the core material 180 at locations which are furthest perpendicularly from the central plane 191 comprises a second material which is different from the first material. At locations between the central plane 191 and locations which are furthest perpendicularly from the central plane 191, the core material 180 comprises a mixture, or combination, of the first and second material in varying amounts. The refractive index of the first material is in the range of approximately 1.40–3.00 and the refractive index of the second material is in the range of approximately 1.30–1.49. Preferably, the refractive index of the first material is in the range of approximately 1.49–1.56. In a more preferred embodiment, the index of refraction of the first material is 1.49 while the index of refraction of the second material is 1.33. In another preferred embodiment of the present invention, the index of refraction of the second material is in the range of approximately 87% to 99% of that of the first material, with 90% being the more preferred percentage.

General principles behind the fabrication of gradient index materials are well known in the art. For example, gradient index lenses are commercially available from Gradient Lens Corp. in Rochester, N.Y. and gradient index optical fibers are commercially available from SpecTran Specialty Optics Company in Avon, Conn.

The first material preferably comprises polyacrylic or polycarbonate. Materials which may be used as the first material include, for example, Plexiglas®, silicone, silica, and diamond-like materials. More preferably, the first material comprises Plexiglas®. The second material preferably comprises a fluorinated polymer or polyacrylic. Materials which may be used as the second material include, for example, PMMA, polytetrafluoroethylene (Teflon®), silicone and silica. More preferably, the second material comprises PMMA or polytetrafluoroethylene).

As also illustrated in FIG. 6, light 22 traveling through the core material 180 is gradually and continuously refracted or bent towards the central plane 191, i.e. the location of the highest refractive index. As shown in the figure, the light rays never strike the outside edge of the waveguide 110a where a reflection, or bounce, would take place. Thus, with the use of a gradient refractive index core 180, there are no discrete bounces of the light rays 22 and therefore little or no loss of light occurs, thereby increasing the efficiency, performance and quality of the optical panel.

FIG. 7 is a side view cross sectional schematic of the planar optical waveguide 110a shown in FIG. 6 illustrating the reduction or elimination of chromatic dispersion, in accordance with a preferred embodiment of the present invention. Light 22 (i.e. comprising at least 2 different wavelengths), entering the core material 180 at the same angle, tends to separate due to the different indices of refraction. However, since the indices of refraction differ gradually and continuously, the separation that occurs of the light 22 (i.e. chromatic dispersion) is significantly restricted such that light separation or displacement of the individual light rays of the different wavelengths does not occur or occurs only minimally upon exiting the core material 180. Thus, with the use a gradient refractive index core 180, the deleterious effects of chromatic dispersion usually exhibited by optical waveguides of step index cladding type is reduced or eliminated, thereby increasing the performance and quality of the optical panel.

Similar to the reduction or elimination of chromatic dispersion that occurs when using the waveguides of the present invention, the light 22 (i.e. whether composed of more than one wavelength or even one wavelength) exits the gradient refractive index core 180 in an exit cone angle within a range which is smaller than that exhibited by the step index cladding type waveguides.

As in the case of step index cladding type optical waveguides, the waveguides 110a of the present invention are in the form of flat ribbons extending continuously in the horizontal direction along the width of the outlet face 24 (see FIG. 1). The ribbon waveguides 110a are preferably stacked vertically along the height of the outlet face 24. The vertical resolution of the panel 10 is thus dependent on the number of waveguides 110a stacked along the height of the outlet face 24. For example, a stacking of 525 waveguides would provide 525 vertical lines of resolution for a standard television. A stacking of 1,100 waveguides would similarly provide 1,100 vertical lines of resolution for a high definition TV (HDTV).

The plurality of waveguides 110a may be stacked directly on top of one another or may optionally have a black pigmented layer between each waveguide 110a for purposes of improving contrast and absorbing ambient light. The black pigmented layer may be provided by way of, for example, spray deposition or adhesive. The black pigmented layer that may be employed with the waveguides 110a of the present invention may also be of the type mentioned in copending patent application Ser. No. 09/469,092 mentioned above. The composition, manner of making, and utilization of the black pigmented layer is described in the 09/469,092 application and is hereby incorporated herein by reference thereto.

Similarly, the light coupler 16 (see FIGS. 1–3) that may be employed with the waveguides 110a of the present invention may be of the type mentioned in copending patent application Ser. No. 09/469,092 mentioned above. The composition, manner of making, and utilization of the coupler 16 is described in the Ser. No. 09/469,092 application and is hereby incorporated herein by reference thereto. The coupler is provided at the inlet face 20 to redirect light traveling from an axis non-perpendicular to the inlet face 20 to an axis perpendicular to the inlet face 20. The closer the refraction indices become between that of the first material and second material, the more desirable it becomes to direct the light closer to an axis which is perpendicular to the inlet face 20. For example, when the index of refraction of the second material is in the range of approximately 97% to 99% of that of the first material, it is preferable to provide light traveling from an axis which is within ±10° from a perpendicular to the inlet face 20.

The dimensions, i.e. the length, width, and thickness, of the waveguides 110a may be identical to the waveguides 10a of step index cladding type as described in the Ser. No. 09/469,092 application. Or, the dimensions may alternatively differ therefrom.

Those of ordinary skill in the art will recognize that many modifications and variations of the present invention may be implemented. For example, although the optical waveguides 110a are described in connection with an optical panel 10 of the configuration shown in FIG. 1, other optical panel types, such as that described in U.S. Pat. No. 5,625,736, may employ the waveguides 110a of the present invention and can expect to have the same or similar advantages associated with the use thereof. The foregoing description and the following claims are intended to cover all such modifications and variations.

What is claimed is:

1. A plurality of stacked planar optical waveguides for an optical panel, each optical waveguide comprising:
   a planar sheet of core material having a central plane, the core material having an index of refraction which decreases as the distance from the central plane increases.

2. The optical waveguides of claim 1, wherein the decrease in the index of refraction occurs gradually and continuously.

3. The optical waveguides of claim 1, wherein the decrease in the index of refraction occurs at a constant rate as the distance from the central plane increases.

4. The optical waveguides of claim 1, wherein the decrease in the index of refraction occurs at an exponential rate as the distance from the central plane increases.

5. The optical waveguides of claim 1, wherein the index of refraction of the core material at the central plane is in the range of approximately 1.40 to 3.00.

6. The optical waveguides of claim 1, wherein the index of refraction of the core material at the central plane is in the range of approximately 1.49 to 1.56.

7. The optical waveguides of claim 6, wherein the index of refraction of the core material at a location which is furthest perpendicularly from the central plane is in the range of approximately 1.30 to 1.49.

8. The optical waveguides of claim 1, wherein the index of refraction of the core material at the central plane is approximately 1.49.

9. The optical waveguides of claim 8, wherein the index of refraction of the core material at a location which is furthest perpendicularly from the central plane is approximately 1.33.

10. The optical waveguides of claim 1, wherein the core material at the central plane is composed substantially of polyacrylic.

11. The optical waveguides of claim 1, wherein the core material at the central plane is composed substantially of polycarbonate.

12. The optical waveguides of claim 1, wherein the core material at the central plane is composed substantially of Plexiglas®.

13. The optical waveguides of claim 1, wherein the core material at the central plane is composed substantially of silicone.

14. The optical waveguides of claim 1, wherein the core material at the central plane is composed substantially of silica.

15. The optical waveguides of claim 1, wherein the core material at the central plane is composed substantially of diamond-like material.

16. The optical waveguides of claim 1, wherein the core material at a location which is furthest perpendicularly from the central plane is composed substantially of a fluorinated polymer.

17. The optical waveguides of claim 1, wherein the core material at a location which is furthest perpendicularly from the central plane is composed substantially of polyacrylic.

18. The optical waveguides of claim 1, wherein the core material at a location which is furthest perpendicularly from the central plane is composed substantially of polytetrafluoroethylene.

19. The optical waveguides of claim 1, wherein the core material at a location which is furthest perpendicularly from the central plane is composed substantially of polymethylmethacrylate (PMMA).

20. The optical waveguides of claim 1, wherein the core material at a location which is furthest perpendicularly from the central plane is composed substantially of silicone.

21. The optical waveguides of claim 1, wherein the core material at a location which is furthest perpendicularly from the central plane is composed substantially of silica.

22. The optical waveguides of claim 1, wherein the index of refraction of the core material at a location which is furthest perpendicularly from the central plane is in the range of approximately 87% to 99% of that at the central plane.

23. The optical waveguides of claim 1, wherein the index of refraction of the core material at a location which is furthest perpendicularly from the central plane is approximately 90% of that at the central plane.

24. The optical waveguides of claim 1, wherein the planar sheet of core material is formed as a flat ribbon extending continuously in a horizontal direction along a face of the optical panel.

25. An optical panel, comprising:
   a plurality of stacked optical waveguides, each optical waveguide having a first end and a second end, wherein an outlet face is defined by the plurality of first ends, and wherein an inlet face is defined by the plurality of second ends, each optical waveguide comprising a planar sheet of core material having a central plane, the core material having an index of refraction which decreases as the distance from the central plane increases.

26. The optical panel of claim 25, wherein the decrease in the index of refraction occurs gradually and continuously.

27. The optical panel of claim 25, wherein the decrease in the index of refraction occurs at a constant rate as the distance from the central plane increases.

28. The optical panel of claim 25, wherein the decrease in the index of refraction occurs at an exponential rate as the distance from the central plane increases.

29. The optical panel of claim 25, wherein the index of refraction of the core material at the central plane is in the range of approximately 1.40 to 3.00.

30. The optical panel of claim 25, wherein the index of refraction of the core material at the central plane is in the range of approximately 1.49 to 1.56.

31. The optical panel of claim 30, wherein the index of refraction of the core material at a location which is furthest perpendicularly from the central plane is in the range of approximately 1.30 to 1.49.

32. The optical panel of claim 25, wherein the index of refraction of the core material at the central plane is approximately 1.49.

33. The optical panel of claim 32, wherein the index of refraction of the core material at a location which is furthest perpendicularly from the central plane is approximately 1.33.

34. The optical panel of claim 25, wherein the core material at the central plane is composed substantially of polyacrylic.

35. The optical panel of claim 25, wherein the core material at the central plane is composed substantially of polycarbonate.

36. The optical panel of claim 25, wherein the core material at the central plane is composed substantially of Plexiglas®.

37. The optical panel of claim 25, wherein the core material at the central plane is composed substantially of silicone.

38. The optical panel of claim 25, wherein the core material at the central plane is composed substantially of silica.

39. The optical panel of claim 25, wherein the core material at the central plane is composed substantially of diamond-like material.

40. The optical panel of claim 25, wherein the core material at a location which is furthest perpendicularly from the central plane is composed substantially of a fluorinated polymer.

41. The optical panel of claim 25, wherein the core material at a location which is furthest perpendicularly from the central plane is composed substantially of polyacrylic.

42. The optical panel of claim 25, wherein the core material at a location which is furthest perpendicularly from the central plane is composed substantially of polytetrafluoroethylene.

43. The optical panel of claim 25, wherein the core material at a location which is furthest perpendicularly from the central plane is composed substantially of polymethylmethacrylate (PMMA).

44. The optical panel of claim 25, wherein the core material at a location which is furthest perpendicularly from the central plane is composed substantially of silicone.

45. The optical panel of claim 25, wherein the core material at a location which is furthest perpendicularly from the central plane is composed substantially of silica.

46. The optical panel of claim 25, wherein the index of refraction of the core material at a location which is furthest perpendicularly from the central plane is in the range of approximately 87% to 99% of that at the central plane.

47. The optical panel of claim 25, wherein the index of refraction of the core material at a location which is furthest perpendicularly from the central plane is approximately 90% of that at the central plane.

48. The optical panel of claim 25, wherein the planar sheet of core material is formed as a flat ribbon extending continuously in a horizontal direction along the outlet face.

49. The optical panel of claim 25, wherein the inlet face is substantially parallel to the outlet face.

50. The optical panel of claim 25, wherein a black pigmented layer is provided between each of the plurality of optical waveguides.

51. The optical panel of claim 25, wherein at least one coupler is provided at the inlet face to redirect light traveling from an axis non-perpendicular to the inlet face to an axis perpendicular to the inlet face.

52. The optical panel of claim 25, wherein at least one coupler is provided at the inlet face to redirect light traveling from an off perpendicular to the inlet face to an axis perpendicular ±10° to the inlet face.

\* \* \* \* \*